US008336093B2

United States Patent
Eom et al.

(10) Patent No.: US 8,336,093 B2
(45) Date of Patent: Dec. 18, 2012

(54) ABNORMAL IPSEC PACKET CONTROL SYSTEM USING IPSEC CONFIGURATION AND SESSION DATA, AND METHOD THEREOF

(75) Inventors: Young Ik Eom, Gyeonggi-do (KR); Ka Eul Kim, Gyeonggi-do (KR); Kwangsun Ko, Seoul (KR); Gyehyeon Gyeong, Gyeonggi-do (KR); Seong Goo Kang, Gyeonggi-do (KR); Yonghyeog Kang, Gyeonggi-do (KR); Hyunjin Cho, Seoul (KR); Hyunsu Jang, Incheon (KR); Yong Woo Jung, Seoul (KR); Hyunwoo Choi, Gyeonggi-do (KR)

(73) Assignee: Sungkyunkwan University Foundation for Corporate Collaboration, Suwon, Gyeonggi-Do (KR)

( * ) Notice: Subject to any disclaimer, the term of this patent is extended or adjusted under 35 U.S.C. 154(b) by 1114 days.

(21) Appl. No.: 11/707,575

(22) Filed: Feb. 16, 2007

(65) Prior Publication Data

US 2008/0168551 A1 Jul. 10, 2008

(30) Foreign Application Priority Data

Jan. 8, 2007 (KR) .......................... 10-2007-0002005

(51) Int. Cl.
G06F 9/00 (2006.01)

(52) U.S. Cl. ....................................................... 726/13

(58) Field of Classification Search ............... 726/11–14
See application file for complete search history.

(56) References Cited

U.S. PATENT DOCUMENTS

| 6,356,951 | B1 * | 3/2002 | Gentry, Jr. ..................... 709/250 |
| 7,107,464 | B2 * | 9/2006 | Shapira et al. .................. 726/15 |
| 2005/0044068 | A1 * | 2/2005 | Lin et al. ............................ 707/3 |
| 2007/0180227 | A1 * | 8/2007 | Akimoto ....................... 713/153 |

FOREIGN PATENT DOCUMENTS

| KR | 10-2002-0051599 A | 6/2002 |
| KR | 10-2003-0056700 A | 7/2003 |

* cited by examiner

*Primary Examiner* — Cordelia Zecher
(74) *Attorney, Agent, or Firm* — Edwards Wildman Palmer LLP

(57) ABSTRACT

An abnormal Internet Protocol Security (IPSec) packet control system and method utilizes IPSec configuration and session data to detect whether or not packets encrypted by an extended header are abnormal. The IPSec packet control system can include an extended header processing unit that receives an IPSec packet and extracts the data to be used in traffic control; check units for checking the packets in the stages of IPSec configuration and IPSec communication that receive the extracted data to determine whether or not the IPSec packet has passed; and a control unit that allows the IPSec to pass or to be blocked according to a determination result from the check units for checking the IPSec configuration and communication packets, where abnormal IPSec packets are blocked using the IPSec configuration and session tables without requiring them to be decrypted and encrypted.

31 Claims, 7 Drawing Sheets

Figure 3

| SOURCE IP ADDRESS DATA | DESTINATION ADDRESS DATA | SPI DATA | SEQUENCE NUMBER DATA |
|---|---|---|---|
| X | Y | 0x09086FC2 | 2 |
| Y | X | 0x00DFEDF1 | 4 |
| Z | X | 0x020CA801 | 1 |

Figure 4

| SOURCE IP ADDRESS DATA | DESTINATION ADDRESS DATA | COMMUNICATION MODE DATA | NUMBER DATA |
|---|---|---|---|
| X | Y | Quick Mode(32) | 2 |
| Y | X | Quick Mode(32) | 2 |
| Z | X | Aggressive Mode(1) | 1 |

ABNORMAL IPSEC PACKET CONTROL SYSTEM USING IPSEC CONFIGURATION AND SESSION DATA, AND METHOD THEREOF

CROSS-REFERENCE TO RELATED APPLICATION

The present application claims, under 35 U.S.C. §119(a), the benefit of Korean Patent Application No. 10-2007-0002005, filed Jan. 8, 2007, the entire contents of which are hereby incorporated by reference.

BACKGROUND OF THE INVENTION

1. Field of the Invention

The present invention relates to an abnormal Internet Protocol Security (IPSec) packet control system using IPSec configuration and session data, and a method thereof, and more particularly to an abnormal IPSec packet control system using IPSec configuration and session data which detects whether or not the packets encrypted by an Encapsulating Security Payload (ESP) extended header are abnormal using IPSec configuration and session data tables without decrypting them, thereby blocking harmful packets, and a method thereof.

2. Background Art

As generally known in the art, an IPSec is a standard protocol for security in a network layer during network communication, and has been developed by an Internet Engineering Task Force (IETF) for use in realizing a Virtual Private Network (VPN) in the Internet. IPSec secures integrity and confidentiality of transmission data, and supports authentication for data and communication subject. However, since harmful packets are often sent, as is the case where a large quantity of abnormal session configuration request messages are sent, making poor use of IPSec, or where the packets, to which IPSec is applied, are sent while adding abnormal data thereto, there is a need for security technology to solve this problem. For instance, such technology includes a firewall, an Intrusion Detection System (IDS), an Intrusion Prevention System (IPS), a harmful packet control system, etc., which control packets using a packet filtering rule.

FIG. 1 is a block diagram for explaining conventional technology of blocking harmful packets. As illustrated in the conventional technology using the packet filtering rule, the packet filtering rule 2 is configured for the purpose of blocking harmful packets created in the Internet, and a packet 1 is blocked 3 or passed 4 depending upon its consistency or inconsistency with a corresponding rule. For reference, a reference numeral 5 denotes a network manager, and a reference numeral 6 denotes a creation module of a packet filtering rule, a detailed explanation of which, however, is omitted.

In particular, the conventional technology of blocking an abnormal IPSec traffic in an IPv6 network can be in general classified into the following two types. The first type is an IP header information-based security system, which had been used in a conventional IPv6 so as to detect and cope with misuse or abnormal operation using IP header information and high layer information. The second type is a key distribution based security system, which copes with corresponding attacks by sharing a key for use in IPSec communication between the security system and a host or a security gateway in charge of IPSec session configuration and communication.

The IP header information-based security system cannot process encrypted IPSec traffic itself, or if it does, it detects abnormal IPSec traffic with only IP header information and high layer information. In addition, the key distribution-based security system detects and copes with it by decrypting encrypted data, to which an ESP extended header is adapted, with a shared key.

An example of packet control technology is disclosed in Korean Unexamined Patent Publication No. 2002-00515996 (published on Jun. 28, 2002, and entitled 'Security Policy System in Distributed Computing Environment, and a Method thereof').

The technology disclosed in Korean Unexamined Patent Publication No. 2002-00515996 relates to a security policy system and method, which improve system efficiency by allocating a Security Policy Database (SPDB) storing policy information to a kernel memory and an application memory. In the security policy system in a distributed computing environment divided into an application region and a kernel region, the application region includes: a policy listener that stands by in a block state, while writing a policy request of a kernel in a reading area of a communication channel between the application region and the kernel region, and in response to this, requests negotiations about a new policy and security association (SA), or returns an Existence Assurance Message (EAM) to the kernel; an SPDB that, if the policy request is made by the policy listener, stores packet control-concerned security policy information for a firewall or a packet filtering module, including policy resources for a policy administration system, such as IPSec engine, etc., or a key-concerned system, such as an Internet Key Exchange (IKE), etc.; and a policy adapter that, when the new policy or the SA is negotiated by the policy listener, collects corresponding policy values, and transmits, to the kernel, information on a security policy of the new SA. The kernel region includes: a selDB that stores fields which are used in the kernel except the fields used in the application SPDB, and data on the security policy of the new SA, which are transmitted by the policy adapter; and a Policy Enforcement Point (PEP) that reads, from the selDB, a security policy corresponding to a request, and adapts and enforces the same. That is, in the technology disclosed in Publication No. 2002-00515996, in all the security systems using a security policy, a security policy database is mapped to the kernel as well as to the application to thus minimizes delay of the policy adaptation process, thereby improving system efficiency and performance.

Further, another example of packet control technology is disclosed in Korean Registered Patent No. 0470915 (registered on Jan. 31, 2005, entitled 'Control Method of Internet Information Protection System for Packet Security in IP Layer').

The technology disclosed in Korean Registered Patent No. 0470915 relates to a control method of an Internet information protection system for packet security in an IP layer, which provides a packet protection function in the IP layer for providing, controlling, managing, and evaluating an information protection service in the Internet. The method comprises a first step of, after creating an IP header of a packet intended to be transmitted, determining whether or not a security service for each packet is selected with reference to a security based rule database and a security-associated database, a second step of, if the security based rule database and the security-associated database do not exist, configuring a security based rule through conducting negotiations with a recipient's-side security based rule control server, a third step of negotiating security association with a recipient's-side key exchange server based on the configured security based rule, a fourth step of storing the negotiated security association in a key management server, a fifth step of linking the security based rule concerned to the security association, and a sixth step of transmitting the packet using the security based rule and the security association linked together, while adapting IPSec. In the technology disclosed in Korean Registered Patent No. 0470915, an information protection service can be selectively provided in the process that a message created from a high application layer in converted into a type of IP packet that can be transmitted via the Internet, a multiple-security service can be provided, and an information protection service can be provided to all Internet services without changing the high layer service program.

The technology using the conventional packet filtering rule, however, has a problem in that, since the contents of a packet in the process of IPSec communication are encrypted so that it cannot be known whether or not the packet is harmful, it is difficult to configure a packet filtering rule for a harmful packet.

Moreover, the header information based security system of the prior art also has a problem in that, since it detects an attack with only IP header information and high layer information, when an attack is so launched from many hosts to a single target host as to generate heavy traffic, such as a distributed service denial attack, even traffic of a normal host is detected and blocked.

Furthermore, the key distribution based security system also has a problem in that, although it is possible to configure the packet filtering rule by sharing a key with hosts in IPSec communication, it needs decryption and encryption processes for all packets, so that the system performance deteriorates. In addition, in order to distribute keys, it needs to gain access to additional IPSec communication, or to directly copy the key values, and IPSec end-to-end security is to be broken. Besides, in the case of gaining access to additional IPSec communication, the security system should carry out decryption and encryption processes with other keys, so that the process time is increased.

SUMMARY OF THE INVENTION

Accordingly, the present invention has been made to solve the above-mentioned problems occurring in the prior art, and an object of the present invention is to provide an abnormal IPSec packet control system and method using IPSec configuration and session data, wherein information on packets in the stage of normal IPSec configuration and communication is stored by using an IPSec configuration data table and an IPSec session data table, and packets in the stage of abnormal IPSec configuration and communication are blocked when received.

Another object of the present invention is to provide an abnormal IPSec packet control system and method using IPSec configuration and session data, which check in advance whether or not a packet encrypted by an ESP extended header portion of an IPSec packet is abnormal, thereby improving performance.

A further object of the present invention is to provide an abnormal IPSec packet control system and method using IPSec configuration and session data, which, in order to solve a problem in that the current intrusion detection system or harmful packet control system cannot process an encrypted IPSec packet, reduce a load of a method of key exchange for processing the IPSec packet, so that it is adaptable/applicable to a field of developing such a firewall system and a harmful packet control system, and is capable of effectively controlling even a packet in the stage of abnormal IPSec configuration as well as a packet in the stage of abnormal IPSec communication.

In order to accomplish these objects, the present invention, in one aspect, provides an abnormal Internet Protocol Security (IPSec) packet control system using IPSec configuration data and IPSec session data for controlling traffic in IPSec communication. The system comprises: an extended header processing unit that receives an IPSec packet, divides the same into an IPSec configuration packet and an IPSec communication packet, and extracts the respective data to be used in traffic control; a check unit for checking the packet in the stage of IPSec configuration (hereinafter "the IPSec configuration packet") which includes an IPSec configuration DB that manages IPSec configuration data, receives the data extracted from the IPSec configuration packet, and compares the same with data stored in the IPSec configuration DB to thereby determine whether or not the IPSec packet has passed; a check unit for checking the packet in the stage of IPSec communication (hereinafter, "the IPSec communication packet") which includes an IPSec session DB that manages IPSec session data, receives the data extracted from the IPSec communication packet, and compares the same with data stored in the IPSec communication DB to thereby determine whether or not the IPSec packet has passed; and a control unit that can pass or block the IPSec depending upon a check result from the check unit for checking the IPSec configuration or communication packet.

In the abnormal IPSec packet control system, the extended header processing unit may process the IPSec packet after classifying the same into an extended header portion and a network layer header portion.

Preferably, the extended header processing unit may sort out the IPSec communication packet in the extended header portion, and extract data to be used in the check unit for checking the IPSec communication packet from an ESP extended header portion of the IPSec communication packet.

If the ESP extended header portion does not exist, the extended header processing unit sorts out the IPSec configuration packet in the network layer header portion and extracts data to be used in the check unit for checking the IPSec configuration packet from an Internet Security Association and Key Management Protocol (ISAKMP).

If the data extracted from the ISAKMP is stored in the IPSec configuration database and conforms to an IPSec configuration rule, the check unit for checking the IPSec configuration packet updates the data stored in the IPSec configuration database with the data extracted from the ISAKMP and returns packet passing data to the control unit.

If the data extracted from the ISAKMP is stored in the IPSec configuration database and does not conform to the IPSec configuration rule, the check unit for checking the IPSec configuration packet returns packet blocking data to the control unit.

If the data extracted from the ISAKMP is not stored in the IPSec configuration database and the IPSec configuration packet is not in an IPSec configuration initial mode, the check unit for checking the IPSec configuration packet returns packet blocking data to the control unit.

If the data extracted from the ISAKMP is not stored in the IPSec configuration database and the IPSec configuration packet is in an IPSec configuration initial mode, the check unit for checking the IPSec configuration packet creates an IPSec configuration data table in the IPSec configuration database and returns packet passing data to the control unit.

In the above embodiments, preferably, the IPSec configuration data may include any one among source/destination IP address data existing in an IP header of the IPSec configuration packet, exchange type data existing in the ISAKMP, and number data of the IPSec configuration packet transmitted.

If the data extracted from the ESP extended header portion is stored in the IPSec session database, the check unit for checking the IPSec communication packet updates the data stored in the IPSec session database with the data extracted from the ESP extended header portion and returns packet passing data to the control unit.

If the data extracted from the ESP extended header portion is not stored in the IPSec session database and is not a first IPSec communication stage packet, or if the IPSec configuration stage is not completed where the data is a first IPSec communication stage packet, the check unit for checking the IPSec communication packet returns packet blocking data to the control unit.

If the data extracted from the ESP extended header portion is not stored in the IPSec session database, the data is a first IPSec communication stage packet, and the IPSec configuration stage is completed, the check unit for checking the IPSec communication packet creates an IPSec session data table in the IPSec session database and returns packet passing data to the control unit.

In the above embodiments, preferably, the IPSec session data may include any one among source/destination IP address data existing in an IP header portion and the ESP extended header portion of the IPSec packet, Security Parameter Index (SPI) data, and a sequence number.

In another aspect, the present invention provides an abnormal IPSec packet control method using IPSec configuration data and IPSec session data for controlling traffic in IPSec communication with an IPSec packet control system which includes: an extended header processing unit that receives an IPSec packet and extracts the data to be used in traffic control; a check unit for checking the IPSec configuration packet which includes an IPSec configuration DB that manages IPSec configuration data, and determines whether or not the IPSec packet has passed; a check unit for checking the IPSec communication packet which includes an IPSec session DB that manages IPSec session data, and determines whether or not the IPSec packet has passed; and a control unit that can pass or block the IPSec.

The control method may comprise the steps of: (a) receiving, in the extended header processing unit, the IPSec packet; (b) classifying, in the extended header processing unit, the IPSec packet into an extended header portion and a network layer header portion; (c) determining, in the extended header processing unit, whether or not an ESP extended header portion exists in the extended header portion; (d) if the ESP extended header portion does not exist, extracting, in the extended header processing unit, data from the network layer header portion and transmitting the same to the check unit for checking the IPSec configuration packet; (e) if the ESP extended header portion exists, extracting, in the extended header processing unit, data from the extended header portion and transmitting the same to the check unit for checking the IPSec communication packet; (f) in the check unit for checking the IPSec configuration packet, receiving the data extracted from the network layer header portion, comparing the same with the IPSec configuration data stored in the IPSec configuration database, and determining whether or not the IPSec packet has passed; (g) in the check unit for checking the IPSec communication packet, receiving the data extracted from the extended header portion, comparing the same with the IPSec session data stored in the IPSec session database, and determining whether or not the IPSec packet has passed; and (h) passing or blocking, in the control unit, the IPSec packet depending upon a determination result from the check unit for checking the IPSec configuration or communication packet.

In a preferred embodiment, the step of transmitting the data to the check unit for checking the IPSec configuration packet comprises the steps of: classifying, in the extended header processing unit, the IPSec configuration packet in the network layer header portion; extracting the data to be used in the check unit for checking the IPSec configuration packet from an ISAKMP of the IPSec configuration packet; and transmitting the extracted data to the check unit for checking the IPSec configuration packet.

Preferably, the step of transmitting to the check unit for checking the IPSec communication packet comprises the steps of: classifying, in the extended header processing unit, the IPSec communication packet in the extended header portion; extracting the data to be used in the check unit for checking the IPSec communication packet from an ESP extended header portion of the IPSec configuration packet; and transmitting the extracted data to the check unit for checking the IPSec communication packet.

Also preferably, the determination step by the check unit for checking the IPSec configuration packet comprises the steps of: receiving, in the check unit for checking the IPSec configuration packet, the data extracted from the ISAKMP; determining whether or not the data extracted from the ISAKMP is stored in the IPSec configuration database; if the data is stored, determining whether or not the data extracted from the ISAKMP conforms to an IPSec configuration rule; and if the data is not stored, determining whether or not the IPSec configuration packet is in an IPSec configuration initial mode.

In a preferred embodiment, if the data extracted from the ISAKMP is stored in the IPSec configuration database and conforms to the IPSec configuration rule, the check unit for checking the IPSec configuration packet updates the data stored in the IPSec configuration database with the data extracted from the ISAKMP and returns packet passing data to the control unit.

In another preferred embodiment, if the data extracted from the ISAKMP is stored in the IPSec configuration database and does not conform to the IPSec configuration rule, the check unit for checking the IPSec configuration packet returns packet blocking data to the control unit.

Preferably, if the data extracted from the ISAKMP is not stored in the IPSec configuration database and the IPSec configuration packet is not in an IPSec configuration initial mode, the check unit for checking the IPSec configuration packet returns packet blocking data to the control unit.

Also preferably, if the data extracted from the ISAKMP is not stored in the IPSec configuration database and the IPSec configuration packet is in an IPSec configuration initial mode, the check unit for checking the IPSec configuration packet creates an IPSec configuration data table in the IPSec configuration database and returns packet passing data to the control unit.

In the above embodiments, the IPSec configuration data may preferably include any one among source/destination IP address data existing in an IP header of the IPSec configuration packet, exchange type data existing in the ISAKMP, and number data of the IPSec configuration packet transmitted.

Preferably, the determination step by the check unit for checking the IPSec communication packet comprises the steps of: receiving, in the check unit for checking the IPSec communication packet, the data extracted from the extended header portion; determining whether or not the data extracted from the extended header portion is stored in the IPSec session database; if the data is not stored, determining whether or not the data extracted from the extended header portion is a first IPSec communication stage packet; and if the data is a first IPSec communication stage packet, determining, in the check unit for checking the IPSec configuration packet, whether or not the IPSec configuration step has been completed.

If the data extracted from the ESP extended header portion is stored in the IPSec session database, the check unit for checking the IPSec communication packet updates the data stored in the IPSec session database with the data extracted from the ESP extended header portion and returns packet passing data to the control unit.

If the data extracted from the ESP extended header portion is not stored in the IPSec session database and is not a first IPSec communication stage packet, or if the IPSec configuration stage is not completed where the data is a first IPSec communication stage packet, the check unit for checking the IPSec communication packet returns packet blocking data to the control unit.

If the data extracted from the ESP extended header portion is not stored in the IPSec session database, the data is a first IPSec communication stage packet, and the IPSec configuration stage is completed, the check unit for checking the IPSec communication packet creates an IPSec session data table in the IPSec session database, and returns packet passing data to the control unit.

In the above embodiments, preferably, the IPSec session data may include any one among source/destination IP address data existing in an IP header portion and the ESP extended header portion of the IPSec packet, SPI data, and a sequence number.

BRIEF DESCRIPTION OF THE DRAWINGS

The above and other objects, features and advantages of the present invention will be more apparent from the following detailed description taken in conjunction with the accompanying drawings, in which:

FIG. 3 is a view of an IPSec session data table according to an embodiment of the invention;

FIG. 4 is a view of an IPSec configuration data table according to an embodiment of the invention;

DETAILED DESCRIPTION OF THE PREFERRED EMBODIMENTS

Figure 1:
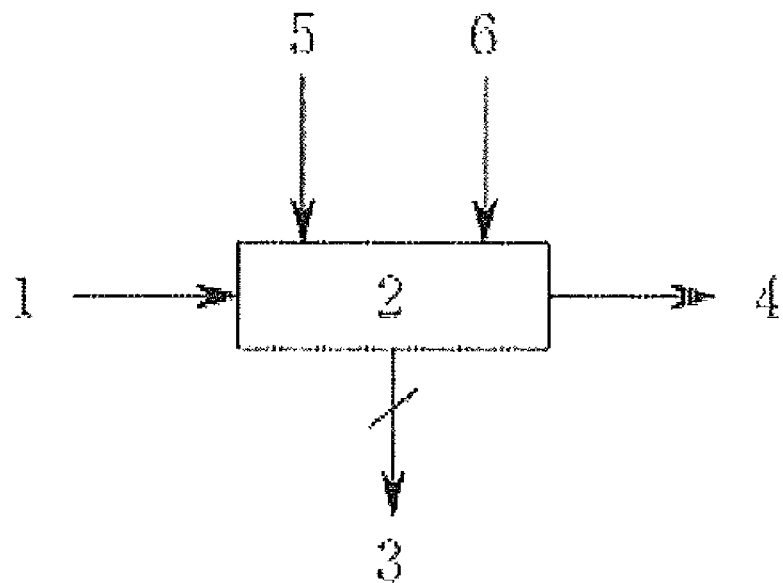
FIG. 1 is a block diagram illustrating harmful packet blocking technology of the prior art.

Hereinafter, a preferred embodiment of the present invention will be described with reference to the accompanying drawings. In the following description and drawings, the same reference numerals are used to designate the same or similar components, and so repetition of the description on the same or similar components will be omitted.

As discussed above, in one aspect, the present invention provides an abnormal IPSec packet control system using IPSec configuration data and IPSec session data for controlling traffic in IPSec communication. The system comprises: an extended header processing unit that receives an IPSec packet, divides the same into an IPSec configuration packet and an IPSec communication packet, and extracts the respective data to be used in traffic control; a check unit for checking the IPSec configuration packet which includes an IPSec configuration DB that manages IPSec configuration data, receives the data extracted from the IPSec configuration packet, and compares the same with data stored in the IPSec configuration DB to thereby determine whether or not the IPSec packet has passed; a check unit for checking the IPSec communication packet which includes an IPSec session DB that manages IPSec session data, receives the data extracted from the IPSec communication packet, and compares the same with data stored in the IPSec communication DB to thereby determine whether or not the IPSec packet has passed; and a control unit that can pass or block the IPSec depending upon a check result from the check unit for checking the IPSec configuration or communication packet.

A preferred abnormal IPSec packet control system using IPSec configuration and session data will now be explained, referring to FIGS. 2 to 4.

Figure 2:
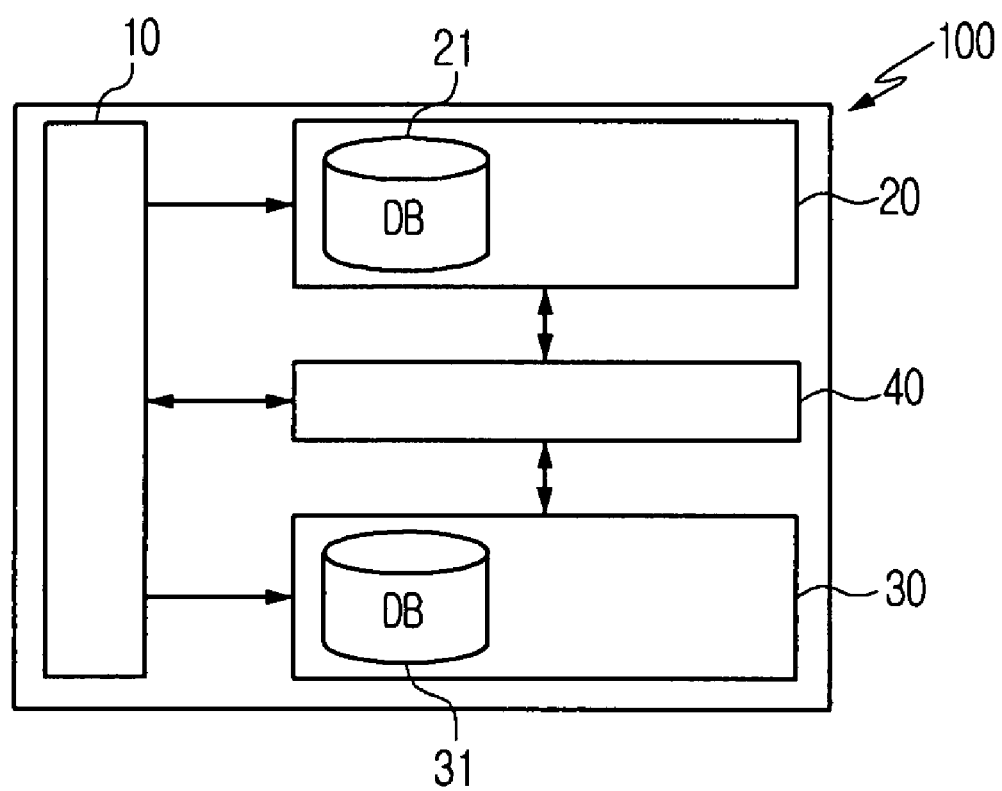
FIG. 2 is a block diagram illustrating an abnormal IPSec packet control system using IPSec configuration and session data according to an embodiment of the invention.

FIG. 2 is a block diagram illustrating the abnormal IPSec packet control system using IPSec configuration and session data according to an embodiment of the invention.

As illustrated in FIG. 2, the abnormal IPSec packet control system 100 using IPSec configuration and session data includes an extended header processing unit 10 that receives an IPSec packet, divides the same into an IPSec configuration packet and an IPSec communication packet, and extracts the respective data to be used in packet control, a check unit 20 for checking the IPSec configuration packet that receives the data extracted in the IPSec configuration packet to determine whether or not the IPSec packet received in the extended header processing unit 10 has passed, a check unit 30 for checking the IPSec communication packet that receives the data extracted in the IPSec communication packet to determine whether or not the IPSec packet received in the extended header processing unit 10 has passed, and a control unit 40 that allows the IPSec received in the extended header processing unit 10 to pass or to be blocked, depending upon the check result from the check unit 20 or 30 for checking the IPSec configuration or communication packet.

The check unit 20 for checking the IPSec configuration packet includes an IPSec configuration DB 21 that manages IPSec session configuration data (hereinafter, "configuration data"), receives the data extracted from the IPSec configuration packet, and compares the same with the data stored in the IPSec configuration DB 21 to thereby determine whether or not the IPSec packet has passed. In addition, the check unit 30 for checking the IPSec communication packet includes an IPSec session DB 31 that manages IPSec session data and compares the data extracted from the IPSec communication packet with the data stored in the IPSec session DB 31 to thereby determine whether or not the IPSec packet has passed.

The IPSec configuration and communication packets used in the present invention mean packets in the stage of session configuration and communication, respectively. The session configuration step and the communication step are the timings when attacks are launched in an IPSec communication, the steps of which are known technology generally used in the present field so detailed explanation thereof will be omitted.

The extended header processing unit 10 processes the IPSec packet after classifying the same into an extended header portion and a network layer header portion, such that the IPSec communication packet is sorted out in the extended header portion, and the IPSec configuration packet is sorted out in the network layer header portion. The classification is implemented according to existence of the ESP extended header portion.

The classified IPSec communication packet is used in the check unit 30 for checking the IPSec communication packet. That is, the extended header processing unit 10 extracts data to be used in the check unit 30 for checking the IPSec communication packet, from the ESP extended header portion pf the IPSec communication packet. On the contrary, the classified IPSec configuration packet is used in the check unit 20 for checking the IPSec configuration packet, which is the case where the ESP extended header portion does not exist. That is, in the case that the ESP header portion does not exist, the extended header processing unit 10 extracts the data to be used in the check unit 20 for checking the IPSec configuration packet from an ISAKMP.

FIG. 3 is a view of an IPSec session data table according to an embodiment of the invention.

An IPSec session database (DB) 31 stores therein IPSec session data in a type of table, as shown in FIG. 3. The IPSec session DB 31 manages IPSec session data in order to block abnormal IPSec traffic in a security system, and is used so as to allow a normal IPSec session not to be sought by an attack and to cope with traffic misusing IPSec technology. IPSec session data is created and updated using source/destination IP address data existing in the IP header portion and the ESP extended header portion of the IPSec packet, Security Parameter Index (SPI) data, and sequence number data, and is deleted directly by a manager.

FIG. 4 is a view of an IPSec configuration data table according to an embodiment of the invention.

An IPSec configuration DB 21 stores therein IPSec configuration data in a type of table, as shown in FIG. 4. The IPSec configuration DB 21 manages IPSec session configuration data for use in raising the reliability of the IPSec session DB 31. IPSec session data is created and updated using source/destination IP address data existing in the IP header portion of the IPSec configuration packet, exchange type data existing in the ISAKMP of a high layer protocol, and number data of the IPSec configuration packet transmitted, and is deleted when a time set by a security policy is exceeded. Since only a session that has normally completed the configuration step in the IPSec configuration DB 21 is added to the IPSec session DB 31, reliability of the IPSec session DB 31 can be increased.

In another aspect, the present invention provides a method by which, upon secret communication using IPSec technology adapted with an ESP header, when a normal IPSec configuration packet is transmitted, it is stored in an IPSec configuration data table, when an abnormal IPSec configuration packet is transmitted, it is blocked with reference to the IPSec configuration data table and an IPSec configuration packet rule, and when an initial IPSec communication packet is transmitted, it is checked whether or not it is a normal IPSec communication packet, with reference to the IPSec configuration data table, to thereby create an IPSec session data table, so that, when an abnormal IPSec communication packet is transmitted, it is blocked with reference to the IPSec session data table.

The present invention, in another aspect, provides an abnormal IPSec packet control method comprising the steps of: (a) receiving, in the extended header processing unit, the IPSec packet; (b) classifying, in the extended header processing unit, the IPSec packet into an extended header portion and a network layer header portion; (c) determining, in the extended header processing unit, whether or not an ESP extended header portion exists in the extended header portion; (d) if the ESP extended header portion does not exist, extracting, in the extended header processing unit, data from the network layer header portion and transmitting the same to the check unit for checking the IPSec configuration packet; (e) if the ESP extended header portion exists, extracting, in the extended header processing unit, data from the extended header portion and transmitting the same to the check unit for checking the IPSec communication packet; (f) in the check unit for checking the IPSec configuration packet, receiving the data extracted from the network layer header portion, comparing the same with the IPSec configuration data stored in the IPSec configuration database, and determining whether or not the IPSec packet has passed; (g) in the check unit for checking the IPSec communication packet, receiving the data extracted from the extended header portion, comparing the same with the IPSec session data stored in the IPSec session database, and determining whether or not the IPSec packet has passed; and (h) passing or blocking, in the control unit, the IPSec packet depending upon a determination result from the check unit for checking the IPSec configuration or communication packet.

Description will now be made of an abnormal IPSec packet control method using IPSec configuration and session data according to the present invention, with reference to FIGS. 5 to 7.

Figure 5:
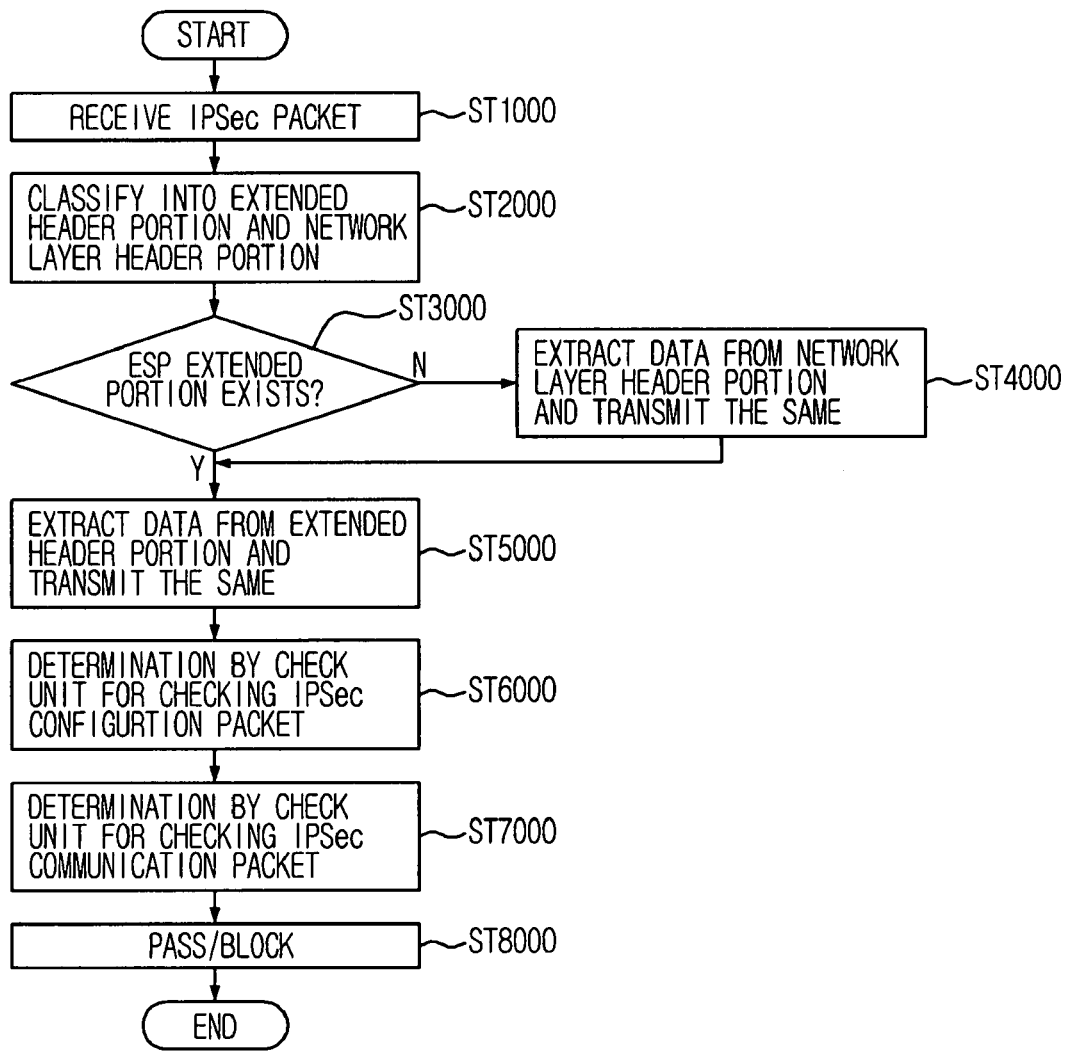
FIG. 5 is a flow chart illustrating an abnormal IPSec packet control method using IPSec configuration and session data according to an embodiment of the invention.

FIG. 5 is a flow chart illustrating an abnormal IPSec packet control method using IPSec configuration and session data according to an embodiment of the invention.

As illustrated in FIG. 5, the extended header processing unit 10 first receives an IPSec packet (ST1000). Then, the extended header processing unit 10 classifies the IPSec packet into an extended header portion and a network layer header portion (ST2000), and determines whether or not an ESP extended header portion exists in the extended header portion (ST3000). If it is determined in ST3000 that the ESP extended header portion does not exist, the extended header processing unit 10 extracts data from the network layer header portion and transmits the same to the check unit 20 for checking the IPSec configuration packet (ST4000). In particular, ST4000 is conducted as follows: First, the extended header processing unit 10 checks a UDP protocol from the network layer header portion, and checks a port number 500 (ISAKMP protocol) of the UDP protocol to classify the IPSec configuration packet. Then, the processing unit extracts data to be used in the check unit 20 for checking the IPSec configuration packet from the ISAKMP of the IPSec configuration packet, and transmits the extracted data to the check unit 20 for checking the IPSec configuration packet.

On the contrary, if it is determined in ST3000 that the ESP extended header portion exists, the extended header processing unit 10 extracts data from the extended header portion and transmits the same to the check unit 30 for checking the IPSec communication packet (ST5000). Since many extended header portions exist in a single packet, in order to classify the IPSec communication packet, the extended header portion is repeatedly checked. In particular, ST5000 is conducted as follows: First, the extended header processing unit 10 classifies an IPSec communication packet in the extended header portion. Then, the processing unit extracts data to be used in the check unit 30 for checking the IPSec communication packet from the ESP extended header portion of the IPSec communication packet, and transmits the extracted data to the check unit 30 for checking the IPSec communication packet.

The check unit 20 for checking the IPSec configuration packet receives the extracted data from the network layer header portion, and compares the same with the IPSec configuration data stored in the IPSec configuration DB 21 to thereby determine whether or not the IPSec packet has passed (ST6000). The check unit 30 for checking the IPSec communication packet also receives the extracted data from the extended header portion, and compares the same with the IPSec session data stored in the IPSec session DB 31 to thereby determine whether or not the IPSec packet has passed (ST7000). ST7000 is implemented only to traffic that has been processed with ST6000.

Finally, after determination has been made in the check units 20 and 30 for checking the IPSec configuration and communication packets, a determination result is transmitted to the control unit 40, which then allows the IPSec packet to pass or to be blocked according to the determination result.

Figure 6:
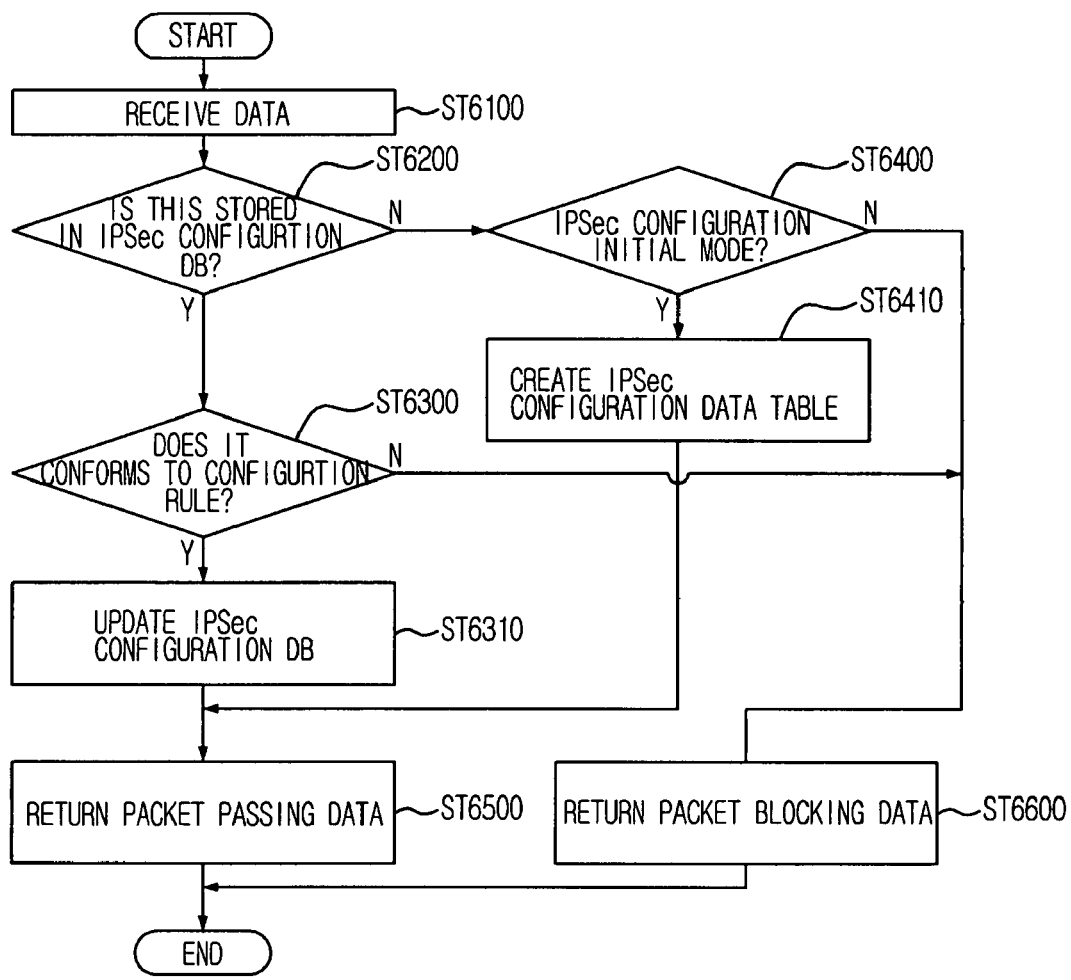
FIG. 6 is a view illustrating the determination step by means of checking a packet in the IPSec configuration step, according to an embodiment of the invention.

FIG. 6 is a view illustrating the determination step by means of checking a packet in the IPSec configuration step, according to an embodiment of the invention.

The data that is extracted from the ISAKMP and is transmitted to the check unit 20 for checking the IPSec configuration packet is the data required for determination of an abnormal IPSec configuration packet and creation of an IPSec configuration data table in the IPSec configuration DB 21. The IPSec configuration data table created using the data is used for the following two uses. First, when created in the check unit 30 for checking the IPSec communication packet, the IPSec configuration data table is used to check whether or nor the IPSec configuration has been successfully completed. Second, the table is used for blocking the abnormal IPSec configuration packet. In order to block the abnormal IPSec configuration packet, a rule according to the respective stages of the IPSec configuration is created based on respective IKE methods.

As illustrated in FIG. 6, ST6000 is specifically conducted as follows: First, the check unit 20 for checking the IPSec configuration packet receives the data extracted from the ISAKMP (ST6100), and determines whether or not the extracted data has been stored in the IPSec configuration DB 21 (ST6200). If it is determined to be so in ST6200, the check unit 20 for checking the IPSec configuration packet determines whether or not the extracted data conforms to an IPSec configuration rule (ST6300). If it is determined in ST6300 to follow the rule, the check unit 20 for checking the IPSec configuration packet updates the data stored in the IPSec configuration DB 21 with the data extracted from the ISAKMP (ST6310), and returns packet passing data to the control unit 40 (ST6500). However, if it is determined in ST6300 not to follow the IPSec configuration rule, the check unit 20 for checking the IPSec configuration packet returns packet blocking data to the control unit 40 (ST6600).

On the contrary, if the data extracted from the ISAKMP is determined in ST6200 not to be stored, the check unit 20 for checking the IPSec configuration packet determines again whether or not the IPSec configuration packet is in an IPSec configuration initial mode (ST6400). If the IPSec configuration packet is determined in ST4000 not to be in IPSec configuration initial mode, the check unit 20 for checking the IPSec configuration packet returns packet blocking data to the control unit 40 (ST6600). However, if it is determined to be in IPSec configuration initial mode, the check unit 20 for checking the IPSec configuration packet creates the IPSec configuration data table in the IPSec configuration DB 21 using source/destination IP address data existing in the IP header portion of the IPSec configuration packet, exchange type data existing in the ISAKMP of a higher protocol, and number data of the IPSec configuration packet transmitted (ST6410), and returns packet passing data to the control unit 40 (ST6500).

Figure 7:
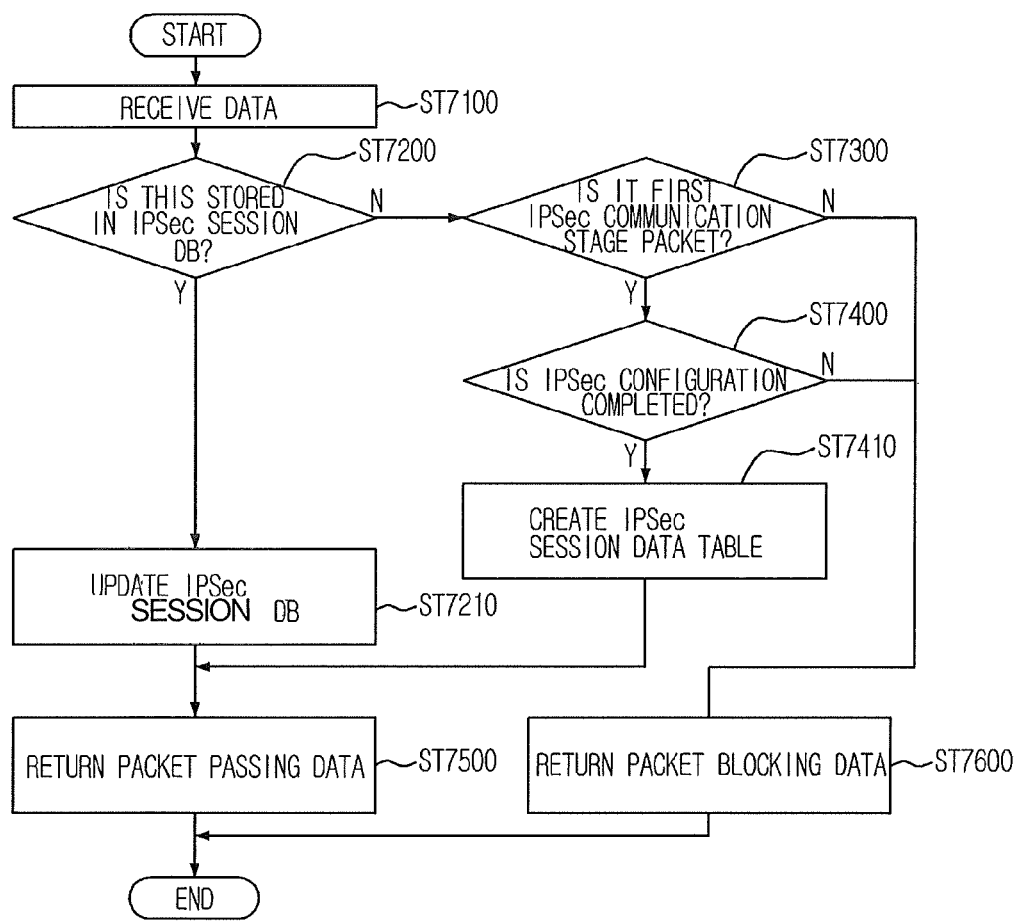
FIG. 7 is a view illustrating the determination step by means of checking a packet in the IPSec communication step, according to an embodiment of the invention.

FIG. 7 is a view illustrating the determination step by means of checking a packet in the IPSec communication step, according to an embodiment of the invention.

The data that is extracted from the extended header portion and is transmitted to the check unit 30 for checking the IPSec communication packet is the data required for determination of an abnormal IPSec communication packet and creation of an IPSec session data table in the IPSec session DB 31.

As illustrated in FIG. 7, ST7000 is specifically conducted as follows: First, the check unit 30 for checking the IPSec communication packet receives the data extracted from the extended header portion (ST7100), and determines whether or not the extracted data has been stored in the IPSec session DB 31 (ST7200). If it is determined to be so in ST7200, the check unit 30 for checking the IPSec communication packet updates the data stored in the IPSec session DB 31 with the data extracted from the ESP extended header portion (ST7210), and returns packet passing data to the control unit 40 (ST7500).

However, if the extracted data is determined in ST7200 not to be stored, the check unit 30 for checking the IPSec communication packet determines again whether or nor the data extracted from the extended header portion is a first IPSec communication stage packet (ST7300). If it is determined in ST7300 to be the first IPSec communication stage packet, the check unit 20 for checking the IPSec configuration packet determines whether or nor the IPSec configuration has been completed (ST7400). If the IPSec configuration is determined to have been completed, the check unit 30 for checking the IPSec communication packet creates an IPSec session data table in the IPSec session DB 31 using source/destination IP address data existing in the IP header portion and the ESP extended header portion of the IPSec packet, SPI data, and sequence number data (ST7410), and returns packet passing data to the control unit 40 (ST7500). However, if it is determined in ST7400 that the IPSec configuration is not to be completed, or if it is determined in ST7300 that the data extracted from the extended header portion is not to be the first IPSec communication packet, the check unit 30 for checking the IPSec communication packet returns packet blocking data to the control unit 40 (ST7600).

IPSec is a basic security mechanism of IPv6 protocol that may replace the IPv4 protocol in the future and be in the spotlight, and many companies are studying and developing a related system to which diverse technologies are adapted, so that the abnormal IPSec packet control system and method of the invention are considered to be marketable. The present invention is applicable and adaptable to an Intrusion Prevention System (IPS) and a harmful network traffic control system, and the field of developing firewalls.

As set forth before, according to the abnormal IPSec packet control system and method using IPSec configuration and session data, the abnormal IPSec packets are blocked using the IPSec configuration and session data tables without decryption and encryption thereof, thereby processing the IPSec packets without performance degradation of a system.

Further, according to the abnormal IPSec packet control system and method using IPSec configuration and session data, it can check in advance whether or not a packet encrypted by the ESP extended header portion of the IPSec packet is abnormal, thereby improving performance.

Furthermore, according to the abnormal IPSec packet control system and method using IPSec configuration and session data, it can solve a problem in that the current intrusion detection system or harmful packet control system cannot process an encrypted IPSec packet and reduce a load of a method of key exchange for processing the IPSec packet, thereby reducing degradation in performance.

Moreover, according to the abnormal IPSec packet control system and method using IPSec configuration and session data, the IPSec session data table is created and updated through the check unit for checking the IPSec configuration packet, and only traffic that has been processed with the IPSec configuration is allowed to pass, which increases the reliability of the IPSec session data table.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

What is claimed is:

1. An abnormal Internet Protocol Security (IPSec) packet control system using IPSec configuration data and IPSec session data for controlling traffic in IPSec communication, the system comprising:
    an extended header processing unit that receives an IPSec packet, classifies the IPSec packet into an extended header portion in which an IPSec communication packet is sorted out and a network layer header portion in which an IPSec configuration packet is sorted out by identifying the IPSec communication packet if the extended header portion is encrypted by an Encapsulating Security Payload (ESP), and if not, then identifying the IPSec configuration packet, and extracts the IPSec configuration data and the IPSec session data to be used in traffic control;
    a first check unit for checking at least source/destination address data and communication mode data of the IPSec configuration packet and blocking an abnormal packet, the first check unit including an IPSec configuration DB that manages the IPSec configuration data, receives the IPSec configuration data extracted from the IPSec configuration packet, and compares the IPSec configuration data with data stored in the IPSec configuration DB to thereby determine whether or not the IPSec packet has passed;
    a second check unit for checking at least the source/destination address data and security data of the IPSec communication packet and blocking abnormal traffic, the second check unit including an IPSec session DB that manages the IPSec session data, receives the IPSec session data extracted from the IPSec communication packet, and compares the IPSec session data with data stored in the IPSec session DB to thereby determine whether or not the IPSec packet has passed; and
    a control unit that can pass or block the IPSec packet depending upon check results from the first and second check units for checking the IPSec configuration packet and the IPSec communication packet.

2. The system as claimed in claim 1, wherein the extended header processing unit sorts out the IPSec communication packet in the extended header portion, and extracts data to be used in the second check unit for checking the IPSec communication packet from an Encapsulating Security Payload (ESP) extended header portion of the IPSec communication packet.

3. The system as claimed in claim 2, wherein, if the ESP extended header portion does not exist, the extended header processing unit sorts out the IPSec configuration packet in the network layer header portion and extracts data to be used in the first check unit for checking the IPSec configuration packet from an Internet Security Association and Key Management Protocol (ISAKMP).

4. The system as claimed in claim 3, wherein, if the data extracted from the ISAKMP is stored in the IPSec configuration database and conforms to an IPSec configuration rule, the first check unit for checking the IPSec configuration packet updates the data stored in the IPSec configuration database with the data extracted from the ISAKMP and returns packet passing data to the control unit.

5. The system as claimed in claim 3, wherein, if the data extracted from the ISAKMP is stored in the IPSec configuration database and does not conform to the IPSec configuration rule, the first check unit for checking the IPSec configuration packet returns packet blocking data to the control unit.

6. The system as claimed in claim 3, wherein, if the data extracted from the ISAKMP is not stored in the IPSec configuration database and the IPSec configuration packet is not in an IPSec configuration initial mode, the first check unit for checking the IPSec configuration packet returns packet blocking data to the control unit.

7. The system as claimed in claim 3, wherein, if the data extracted from the ISAKMP is not stored in the IPSec configuration database and the IPSec configuration packet is in an IPSec configuration initial mode, the first check unit for checking the IPSec configuration packet creates an IPSec configuration data table in the IPSec configuration database and returns packet passing data to the control unit.

8. The system as claimed in any one of claims 4 to 7, wherein the IPSec configuration data includes any one among source/destination IP address data existing in an IP header of the IPSec configuration packet, exchange type data existing in the ISAKMP, and number data of the IPSec configuration packet transmitted.

9. The system as claimed in claim 8, wherein, if the data extracted from the ESP extended header portion is stored in the IPSec session database, the second check unit for checking the IPSec communication packet updates the data stored in the IPSec session database with the data extracted from the ESP extended header portion and returns packet passing data to the control unit.

10. The system as claimed in claim 9, wherein the IPSec session data includes any one among source/destination IP address data existing in an IP header portion and the ESP extended header portion of the IPSec packet, Security Parameter Index (SPI) data, and a sequence number.

11. The system as claimed in claim 8, wherein, if the data extracted from the ESP extended header portion is not stored in the IPSec session database and is not a first IPSec communication stage packet, or if the IPSec configuration stage is not completed where the data is a first IPSec communication stage packet, the second check unit for checking the IPSec communication packet returns packet blocking data to the control unit.

12. The system as claimed in claim 11, wherein the IPSec session data includes any one among source/destination IP address data existing in an IP header portion and the ESP extended header portion of the IPSec packet, SPI data, and a sequence number.

13. The system as claimed in claim 8, wherein, if the data extracted from the ESP extended header portion is not stored in the IPSec session database, the data is a first IPSec communication stage packet, and the IPSec configuration stage is completed, the second check unit for checking the IPSec communication packet creates an IPSec session data table in the IPSec session database and returns packet passing data to the control unit.

14. The system as claimed in claim 13, wherein the IPSec session data includes any one among source/destination IP address data existing in an IP header portion and the ESP extended header portion of the IPSec packet, SPI data, and a sequence number.

15. An abnormal IPSec packet control method using IPSec configuration data and IPSec session data for controlling traffic in IPSec communication with an IPSec packet control system which includes: an extended header processing unit that receives an IPSec packet, classifies the IPSec packet into an extended header portion in which an IPSec communication packet is sorted out and a network layer header portion in which an IPSec configuration packet is sorted out by identifying the IPSec communication packet if the extended header portion is encrypted by an Encapsulating Security Payload (ESP), and if not, then identifying the IPSec configuration packet, and extracts the IPSec configuration data and the IPSec session data to be used in traffic control; a first check unit for checking the IPSec configuration packet which includes an IPSec configuration DB that manages the IPSec configuration data, and determines whether or not the IPSec packet has passed; a second check unit for checking the IPSec communication packet which includes an IPSec session DB that manages the IPSec session data, and determines whether or not the IPSec packet has passed; and a control unit that can pass or block the IPSec packet, the control method comprising the steps of:
  receiving, in the extended header processing unit, the IPSec packet;
  classifying, in the extended header processing unit, the IPSec packet into the extended header portion and the network layer header portion;
  determining, in the extended header processing unit, whether or not an ESP extended header portion exists in the extended header portion;
  if the ESP extended header portion does not exist, extracting, in the extended header processing unit, data from the network layer header portion and transmitting the same to the first check unit for checking the IPSec configuration packet;
  if the ESP extended header portion exists, extracting, in the extended header processing unit, data from the extended header portion and transmitting the same to the second check unit for checking the IPSec communication packet;
  in the first check unit for checking at least source/destination address data and communication mode data of the IPSec configuration packet, receiving the IPSec configuration data extracted from the network layer header portion, comparing the IPSec configuration data with the IPSec configuration data stored in the IPSec configuration database, and determining whether or not the IPSec packet has passed;
  in the second check unit for checking at least the source/destination address data and security data of the IPSec communication packet, receiving the data extracted from the extended header portion, comparing the IPSec session data with the IPSec session data stored in the IPSec session database, and determining whether or not the IPSec packet has passed; and
  passing or blocking, in the control unit, the IPSec packet depending upon determination results from the first and second check units for checking the IPSec configuration packet and the IPSec communication packet.

16. The method as claimed in claim 15, wherein the step of transmitting the data to the first check unit for checking the IPSec configuration packet comprises the steps of:
  classifying, in the extended header processing unit, the IPSec configuration packet in the network layer header portion;
  extracting the data to be used in the first check unit for checking the IPSec configuration packet from an ISAKMP of the IPSec configuration packet; and
  transmitting the extracted data to the first check unit for checking the IPSec configuration packet.

17. The method as claimed in claim 16, wherein the step of transmitting to the second check unit for checking the IPSec communication packet comprises the steps of:
  classifying, in the extended header processing unit, the IPSec communication packet in the extended header portion;
  extracting the data to be used in the second check unit for checking the IPSec communication packet from an ESP extended header portion of the IPSec configuration packet; and
  transmitting the extracted data to the second check unit for checking the IPSec communication packet.

18. The method as claimed in claim 17, wherein the determination step by the first check unit for checking the IPSec configuration packet comprises the steps of:
  receiving, in the first check unit for checking the IPSec configuration packet, the data extracted from the ISAKMP;
  determining whether or not the data extracted from the ISAKMP is stored in the IPSec configuration database;
  if the data is stored, determining whether or not the data extracted from the ISAKMP conforms to an IPSec configuration rule; and
  if the data is not stored, determining whether or not the IPSec configuration packet is in an IPSec configuration initial mode.

19. The method as claimed in claim 18, wherein, if the data extracted from the ISAKMP is stored in the IPSec configuration database and conforms to the IPSec configuration rule, the first check unit for checking the IPSec configuration packet updates the data stored in the IPSec configuration database with the data extracted from the ISAKMP and returns packet passing data to the control unit.

20. The method as claimed in claim 18, wherein, if the data extracted from the ISAKMP is stored in the IPSec configuration database and does not conform to the IPSec configuration rule, the first check unit for checking the IPSec configuration packet returns packet blocking data to the control unit.

21. The method as claimed in claim 18, wherein, if the data extracted from the ISAKMP is not stored in the IPSec configuration database and the IPSec configuration packet is not in an IPSec configuration initial mode, the first check unit for checking the IPSec configuration packet returns packet blocking data to the control unit.

22. The method as claimed in claim 18, wherein, if the data extracted from the ISAKMP is not stored in the IPSec configuration database and the IPSec configuration packet is in an IPSec configuration initial mode, the first check unit for checking the IPSec configuration packet creates an IPSec configuration data table in the IPSec configuration database and returns packet passing data to the control unit.

23. The method as claimed in any one of claims 18 to 22, wherein the IPSec configuration data includes any one among source/destination IP address data existing in an IP header of the IPSec configuration packet, exchange type data existing in the ISAKMP, and number data of the IPSec configuration packet transmitted.

24. The method as claimed in claim 23, wherein the determination step by the second check unit for checking the IPSec communication packet comprises the steps of:
  receiving, in the second check unit for checking the IPSec communication packet, the data extracted from the extended header portion;
  determining whether or not the data extracted from the extended header portion is stored in the IPSec session database;
  if the data is not stored, determining whether or not the data extracted from the extended header portion is a first IPSec communication stage packet; and
  if the data is a first IPSec communication stage packet, determining, in the first check unit for checking the IPSec configuration packet, whether or not the IPSec configuration step has been completed.

25. The method as claimed in claim 24, wherein the IPSec session data includes any one among source/destination IP address data existing in an IP header portion and the ESP extended header portion of the IPSec packet, SPI data, and a sequence number.

26. The method as claimed in claim 24, wherein, if the data extracted from the ESP extended header portion is stored in the IPSec session database, the second check unit for checking the IPSec communication packet updates the data stored in the IPSec session database with the data extracted from the ESP extended header portion and returns packet passing data to the control unit.

27. The method as claimed in claim 26, wherein the IPSec session data includes any one among source/destination IP address data existing in an IP header portion and the ESP extended header portion of the IPSec packet, SPI data, and a sequence number.

28. The method as claimed in claim 24, wherein, if the data extracted from the ESP extended header portion is not stored in the IPSec session database and is not a first IPSec communication stage packet, or if the IPSec configuration stage is not completed where the data is a first IPSec communication stage packet, the second check unit for checking the IPSec communication packet returns packet blocking data to the control unit.

29. The method as claimed in claim 28, wherein the IPSec session data includes any one among source/destination IP address data existing in an IP header portion and the ESP extended header portion of the IPSec packet, SPI data, and a sequence number.

30. The method as claimed in claim 24, wherein, if the data extracted from the ESP extended header portion is not stored in the IPSec session database, the data is a first IPSec communication stage packet, and the IPSec configuration stage is completed, the second check unit for checking the IPSec communication packet creates an IPSec session data table in the IPSec session database, and returns packet passing data to the control unit.

31. The method as claimed in claim 30, wherein the IPSec session data includes any one among source/destination IP address data existing in an IP header portion and the ESP extended header portion of the IPSec packet, SPI data, and a sequence number.

* * * * *